(12) United States Patent
Kim et al.

(10) Patent No.: US 10,933,364 B2
(45) Date of Patent: Mar. 2, 2021

(54) CYCLONE FOR AIR CLEANING AND FILTERING MODULE HAVING THE SAME

(71) Applicant: LG ELECTRONICS INC., Seoul (KR)

(72) Inventors: Wan Soo Kim, Seoul (KR); Yangkyeong Kim, Seoul (KR); Byungkyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 282 days.

(21) Appl. No.: 15/972,928

(22) Filed: May 7, 2018

(65) Prior Publication Data

US 2018/0318748 A1 Nov. 8, 2018

(30) Foreign Application Priority Data

May 8, 2017 (KR) .................. 10-2017-0057550

(51) Int. Cl.
| | |
|---|---|
| *B01D 53/14* | (2006.01) |
| *B01D 50/00* | (2006.01) |
| *B01D 45/16* | (2006.01) |
| *B04C 9/00* | (2006.01) |

(Continued)

(52) U.S. Cl.
CPC .......... *B01D 50/004* (2013.01); *B01D 45/12* (2013.01); *B01D 45/16* (2013.01); *B01D 47/00* (2013.01); *B01D 47/06* (2013.01); *B04C 5/08* (2013.01); *B04C 9/00* (2013.01); *A47L 9/1608* (2013.01); *B01D 47/10* (2013.01);
(Continued)

(58) Field of Classification Search
CPC ...... B01D 50/004; B01D 47/06; B01D 45/16; B01D 53/00; B01D 47/00; B01D 2247/101; B01D 2247/04; B01D 2221/02; B01D 2247/107; B01D 47/10; B01D 45/12; B04C 9/00; B04C 5/08; B04C 2009/008; B04C 11/00; B04C 5/04; B04C 5/13; A47L 9/16
See application file for complete search history.

(56) References Cited

U.S. PATENT DOCUMENTS

3,129,173 A * 4/1964 Schulze ............... B04C 5/04
 210/512.1
3,131,237 A * 4/1964 Collins, Jr. ........... B01D 47/10
 261/153
(Continued)

FOREIGN PATENT DOCUMENTS

| CN | 2401258 Y | 10/2000 |
|---|---|---|
| CN | 2447045 Y | 9/2001 |

(Continued)

*Primary Examiner* — Dung H Bui
(74) *Attorney, Agent, or Firm* — Birch, Stewart, Kolasch & Birch, LLP

(57) ABSTRACT

A filtering module includes a cyclone having a contaminated air inlet part into which external contaminated air and cleaning water cleaning the contaminated air are each introduced, and a cleaned air outlet part through which air cleaned by bringing the cleaning water into contact with the contaminated air is discharged; a water tank coupled to the cyclone, to which the cleaning water cleaning the contaminated air is introduced, and storing mixed water in which a pre-stored fluid and the cleaning water are mixed; and a fluid circulating part providing the mixed water stored in the water tank to the contaminated air inlet part.

5 Claims, 5 Drawing Sheets

(51) Int. Cl.
  *B04C 5/08* (2006.01)
  *B01D 47/00* (2006.01)
  *B01D 47/06* (2006.01)
  *B01D 45/12* (2006.01)
  *B04C 11/00* (2006.01)
  *B01D 47/10* (2006.01)
  *B04C 5/04* (2006.01)
  *B04C 5/13* (2006.01)
  *A47L 9/16* (2006.01)

(52) U.S. Cl.
  CPC ...... *B01D 2221/02* (2013.01); *B01D 2247/04* (2013.01); *B01D 2247/101* (2013.01); *B01D 2247/107* (2013.01); *B04C 5/04* (2013.01); *B04C 5/13* (2013.01); *B04C 11/00* (2013.01); *B04C 2009/008* (2013.01)

(56) References Cited

U.S. PATENT DOCUMENTS

| | | | | |
|---|---|---|---|---|
| 3,853,505 A | * | 12/1974 | Tretter, Jr. | ............. B01D 50/00 95/188 |
| 4,000,993 A | * | 1/1977 | Holl | ....................... B01D 47/06 95/224 |
| 6,168,641 B1 | * | 1/2001 | Tuvin | ..................... B01D 45/16 55/337 |
| 7,401,599 B2 | * | 7/2008 | Saito | .................. B01D 19/0052 123/518 |
| 2010/0251505 A1 | | 10/2010 | Vrdoljak et al. | |
| 2015/0004064 A1 | * | 1/2015 | Lee | .................... B01D 46/0028 422/121 |
| 2015/0183660 A1 | * | 7/2015 | Wright | ............... B01D 21/0006 210/801 |
| 2015/0224517 A1 | * | 8/2015 | Ramalingam | ............. B04C 9/00 210/85 |

FOREIGN PATENT DOCUMENTS

| | | | | | |
|---|---|---|---|---|---|
| CN | 103157561 A | | 6/2013 | | |
| JP | 2006-68690 A | | 3/2006 | | |
| JP | 2008-38713 A | | 2/2008 | | |
| JP | 2008038713 A | * | 2/2018 | ............ | B01D 45/12 |
| KR | 20-0388418 Y1 | | 6/2005 | | |
| WO | WO 2016/177652 A1 | | 11/2016 | | |

* cited by examiner

CYCLONE FOR AIR CLEANING AND FILTERING MODULE HAVING THE SAME

CROSS-REFERENCE TO RELATED APPLICATIONS

This application claims priority to Korean Patent Application No. 10-2017-0057550, filed on May 8, 2017, in the Korean Intellectual Property Office, the disclosure of which is hereby incorporated by reference in its entirety.

BACKGROUND

1. Technical Field

The present disclosure relates to a cyclone for air cleaning, and to a filtering module having the same. More particularly, the present disclosure relates to a cyclone for air cleaning and a filtering module having the same in which contaminated air containing foreign materials, such as oil and the like, is in contact with cleaning water or vapor so as to be cleaned. The foreign materials, such as oil and the like, are suspended in a water tank so as to be separated and discharged. The water received in the water tank is circulated and is re-supplied as the cleaning water.

2. Description of the Related Art

In general, a hood for air cleaning that forcedly sucks smells and heat generated during cooking and discharges the smells and heat to the outside is mounted over a cooking appliance such as a gas stove.

More specifically, cabinets are typically installed at an upper portion of a wall, and the gas stove is placed on a lower portion of the wall. In addition, an exhaust case, in which an exhaust fan is mounted, is installed over the gas stove. Further, an exhaust pipe is fixed to an upper end of the exhaust case, and a flexible exhaust pipe is inserted into a vent.

In addition, if the exhaust fan installed in the exhaust case operates during cooking using the gas stove, heat of flames from the gas stove and smells generated during the cooking move upwardly and are discharged to the outside through a discharge pipe and the vent.

However, the hood for air-cleaning according to the related art has problems that it requires a large installation space, and it is not aesthetically pleasing.

In order to solve the above-mentioned problems, a downdraft type air cleaning apparatus includes a fan motor, induces contaminated air generated from the gas stove into a downward direction of the gas stove, filters the induced contaminated air, and then discharges the filtered air.

However, the downdraft type air cleaning apparatus according to the related art has a problem that it may not efficiently separate foreign materials, such as oil and the like contained in the contaminated air, from the contaminated air.

Further, the downdraft type air cleaning apparatus according to the related art has a problem that maintenance cost is increased because a cleaning filter should periodically be changed.

Finally, the downdraft type air cleaning apparatus according to the related art has a problem that it is cumbersome to use and maintain since periodic cleaning and maintenance are required.

SUMMARY

It is an object of the present disclosure to provide a filtering module capable of efficiently separating foreign materials, such as oil and the like contained in contaminated air, from the contaminated air by bringing the contaminated air into contact with cleaning water or vapor through an inclined cyclone.

It is another object of the present disclosure to provide a filtering module capable of reducing maintenance cost by removing foreign materials, such as oil and the like, from cleaning water or vapor from which contaminated air is cleaned, and supplying it as the cleaning water or vapor.

It is still another object of the present disclosure to provide a filtering module capable of preventing foreign materials containing oil from being deposited or fixed on an inner wall of a cyclone by cleaning contaminated air using cleaning water or vapor of a room temperature or a temperature higher than room temperature.

Objects of the present disclosure are not limited to the above-described objects, and other objects and advantages can be appreciated by those skilled in the art from the following descriptions. Further, it will be easily appreciated that the objects and advantages of the present disclosure can be practiced by means recited in the appended claims and a combination thereof.

In accordance with one aspect of the present disclosure, an inclined cyclone has a contaminated air inlet part into which contaminated air and cleaning water or vapor are introduced. Accordingly, the contaminated air may come into contact with the cleaning water or vapor, and foreign materials such as oil and the like contained in the contaminated air may be efficiently separated from the contaminated air by a wide contact area and flow by centrifugal force.

The cyclone may include a fluid circulating part. Accordingly, maintenance cost may be reduced since the foreign materials are removed from the cleaning water or vapor, thereby cleaning the contaminated air to be again circulated as the cleaning water or vapor, The fluid circulating part may include a heater to heat the cleaning water or vapor to a temperature higher than the room temperature. Accordingly, it is possible to prevent the foreign materials containing oil from being deposited or fixed on an inner wall of the cyclone, and the filtering module having the cyclone may be automatically cleaned by a flow of the cleaning water or vapor.

The detailed effects of the present disclosure together with the effects described above will be described below with reference to the accompanying drawings.

DETAILED DESCRIPTION

Figure 1:
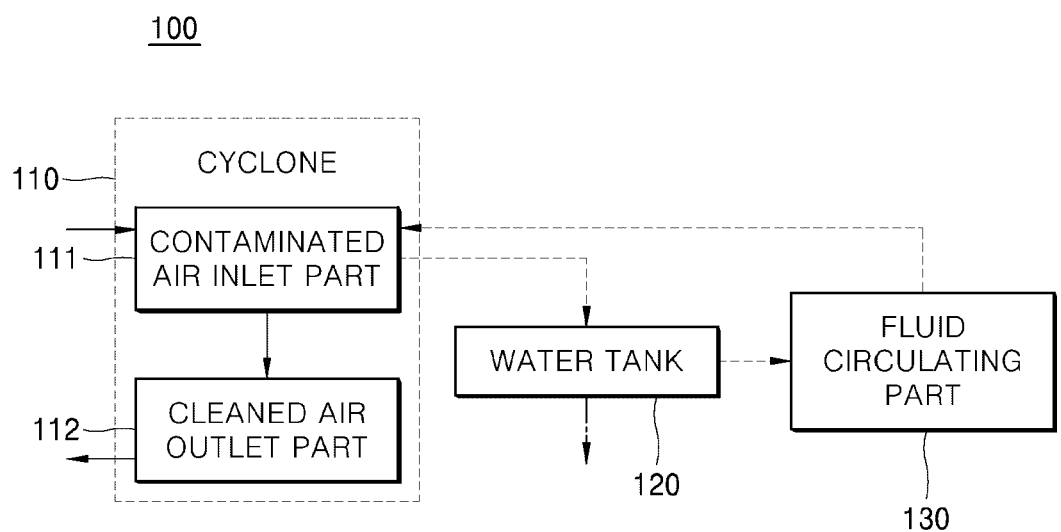
FIG. 1 is a view schematically showing a basic concept of a filtering module according to the present disclosure.

The terms and words used in the present specification and claims should not be construed to be limited to ordinary or dictionary meanings, but the inventors shall construe their own invention as the meaning and concept consistent with the technical ideal of the present disclosure, based on a principle that they can appropriately define the concepts of the terms to describe their own inventions in the best way. Further, since the exemplary embodiments described in the present specification and the configurations shown in the drawings are merely most preferred embodiments and do not represent all of the technical spirit of the present disclosure, it should be understood that various equivalents and modifications may be substituted for those at the time of filing of the present application.

FIG. 1 is a view schematically showing a basic concept of a filtering module according to the present disclosure.

As shown in FIG. 1, a filtering module 100 includes a cyclone 110, a water tank 120, and a fluid circulating part 130.

More specifically, the cyclone 110 is provide to increase a contact area between contaminated air and cleaning water that cleans the contaminated air, and to efficiently separate out foreign materials such as oil and the like contained in the contaminated air using centrifugal force.

To this end, the cyclone 110 includes a contaminated air inlet part 111 into which the contaminated air containing the foreign materials such as oil and the like and the cleaning water or vapor are each introduced, and a cleaned air outlet part 112 through which cleaned air is discharged.

The water tank 120 is provided to collect the foreign materials such as oil and the like separated from the contaminated air, to discharge the collected foreign materials (shown by an alternated long and short dash line arrow), and to again provide the cleaning water or vapor to the contaminated air inlet part 111. To this end, a fluid is pre-stored in the water tank 120.

In other words, the contaminated air is cleaned by being in contact with the cleaning water or vapor, and the cleaning water or vapor containing the foreign materials such as oil and the like is introduced into the water tank 120. The cleaning water or vapor is mixed with the pre-stored fluid. The mixed water obtained accordingly is stored in the water tank 120. Here, the foreign materials contained in the cleaning water or vapor are suspended on a surface of the water by a specific gravity difference with the pre-stored fluid. The foreign materials suspended in the water tank 120 may be separated and discharged, and the water in a lower portion of the water tank 120 may be recycled.

The fluid circulating part 130 is provided to supply the cleaning water or vapor to the water tank 120 from the contaminated air inlet part 111 of the cyclone 110 by using the mixed water.

Here, in order to prevent the foreign materials containing oil from being deposited or fixed on an inner wall of the cyclone, the cleaning water or vapor is provided to the contaminated air inlet part 111 at room temperature or a temperature higher than room temperature.

In FIG. 1, a solid line arrow shows a flow of air, and a dotted line arrow shows a flow of cleaning water or vapor.

Figure 2:
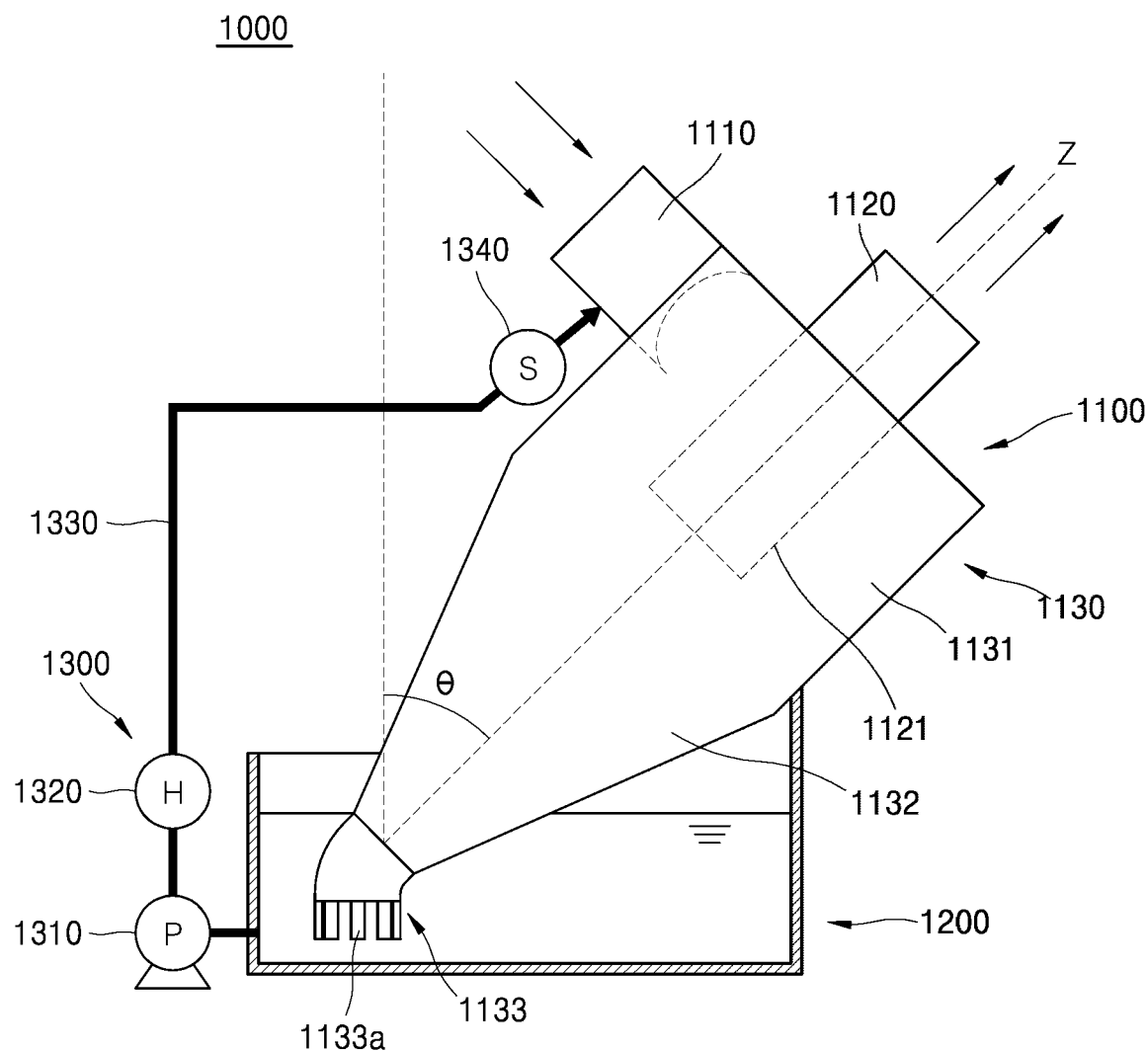
FIG. 2 is a view schematically showing a filtering module according to a first exemplary embodiment of the present disclosure.

FIG. 2 is a view schematically showing a filtering module according to a first exemplary embodiment of the present disclosure.

As shown in FIG. 2, a filtering module 1000 includes a cyclone 1100, a water tank 1200, and a fluid circulating part 1300.

More specifically, the cyclone 1100 may include a contaminated air inlet part 1110, a cleaned air outlet part 1120, and a body part 1130, and may be detachably coupled to the water tank 1200.

The body part 1130 includes a cylindrical body 1131, a conical body 1132 having a truncated lower end, and a discharging part 1133.

The conical body 1132 extends in a downward direction of the cylindrical body 1131, and the discharging part 1133 extends in a downward direction of the conical body 1132.

The cylindrical body 1131, the conical body 1132, and the discharging part 1133 are formed integrally with each other.

The contaminated air inlet part 1110 and the cleaned air outlet part 1120 are connected to the cylindrical body 1131 so as to be in communication with each other. The contaminated air inlet part 1110 may be formed so that the contaminated air is introduced in a side direction of an upper end portion of the cylindrical body 1131, and the cleaned air outlet part 1120 may be formed in the upper end portion of the cylindrical body 1131 so that the cleaned air is discharged in an axial direction (a Z direction in FIG. 2) of the cylindrical body 1131.

Accordingly, the contaminated air inlet part 1110 and the cleaned air outlet part 1120 are disposed in a direction orthogonal to each other. The cleaned air outlet part 1120 has an extension part 1121 formed to extend below the cylindrical body 1131, and the cleaned air is discharged to the outside through the extension part 1121.

This configuration is provided to bring the contaminated air introduced through the contaminated air inlet part 1110 into contact with the cleaning water, to separate the foreign materials contained in the contaminated air while the contaminated air flows in the cylindrical body 1131, and to then discharge only the cleaned air. The extension part 1121 is disposed to extend below the cylindrical body 1131.

The body part 1130 is coupled to the water tank 1200 to be inclined as indicated by θ in FIG. 2. Accordingly, the cylindrical body 1131 and the conical body 1132 are disposed to be inclined about a central axis at which the cyclone 1100 is mounted.

Accordingly, a contact area between the contaminated air introduced through the contaminated air inlet part 1110 and the cleaning water is increased, and air and liquid are efficiently separated from each other by centrifugal force.

The conical body 1132 is connected to the cylindrical body 1131, and causes the cleaning water flowing in the conical body 1132 to flow toward the discharging part 1133.

The conical body 1132 has an inner diameter which is gradually decreased from the cylindrical body 1131 to the discharging part 1133.

The discharging part 1133 is provided to supply the cleaning water flowing through the conical body 1132 to the water tank 1200.

A discharging slit 1133a is formed in the discharging part 1133 so as to easily discharge the foreign materials such as oil and the like contained in the cleaning water. The discharging part 1133 is positioned below the surface of water of the pre-stored fluid stored in the water tank 1200 to be in contact with the fluid pre-stored in the water tank 1200.

The fluid circulating part 1300 includes a pump 1310, a heater 1320, and a connection pipe 1330.

The pump 1310 is provided to produce a flow force for supplying the mixed water, in which the fluid pre-stored in the water tank 1200 and the cleaning water are mixed, to the contaminated air inlet part 1110.

The heater 1320 is provided to increase a temperature of the mixed water supplied by the pump 1310 and to supply the mixed water as the cleaning water. Here, the temperature of the mixed water may be adjusted and an occurrence of vapor may also be adjusted by adjusting a heating time of the heater 1320.

Since the cleaning water is supplied at room temperature or a temperature higher than the room temperature, it prevents the oil from being coagulated or deposited on the inner wall of the cyclone 1100, as described above, thereby making it possible to automatically clean the inner wall of the cyclone 1100.

The connection pipe 1330 interconnects the water tank 1200, the pump 1310, the heater 1320, and the contaminated air inlet part 1110.

The fluid circulating part 1300 may include a temperature sensor 1340 that measures the temperature of the cleaning water which is discharged from the heater 1320. The temperature sensor 1340 may be provided at the contaminated air inlet part 1110 so as to maintain a constant temperature of the cleaning water supplied to the contaminated air inlet part 1110.

The temperature sensor 1340 may be mounted on the connection pipe which is adjacent to the contaminated air inlet part 1110.

Figure 3:
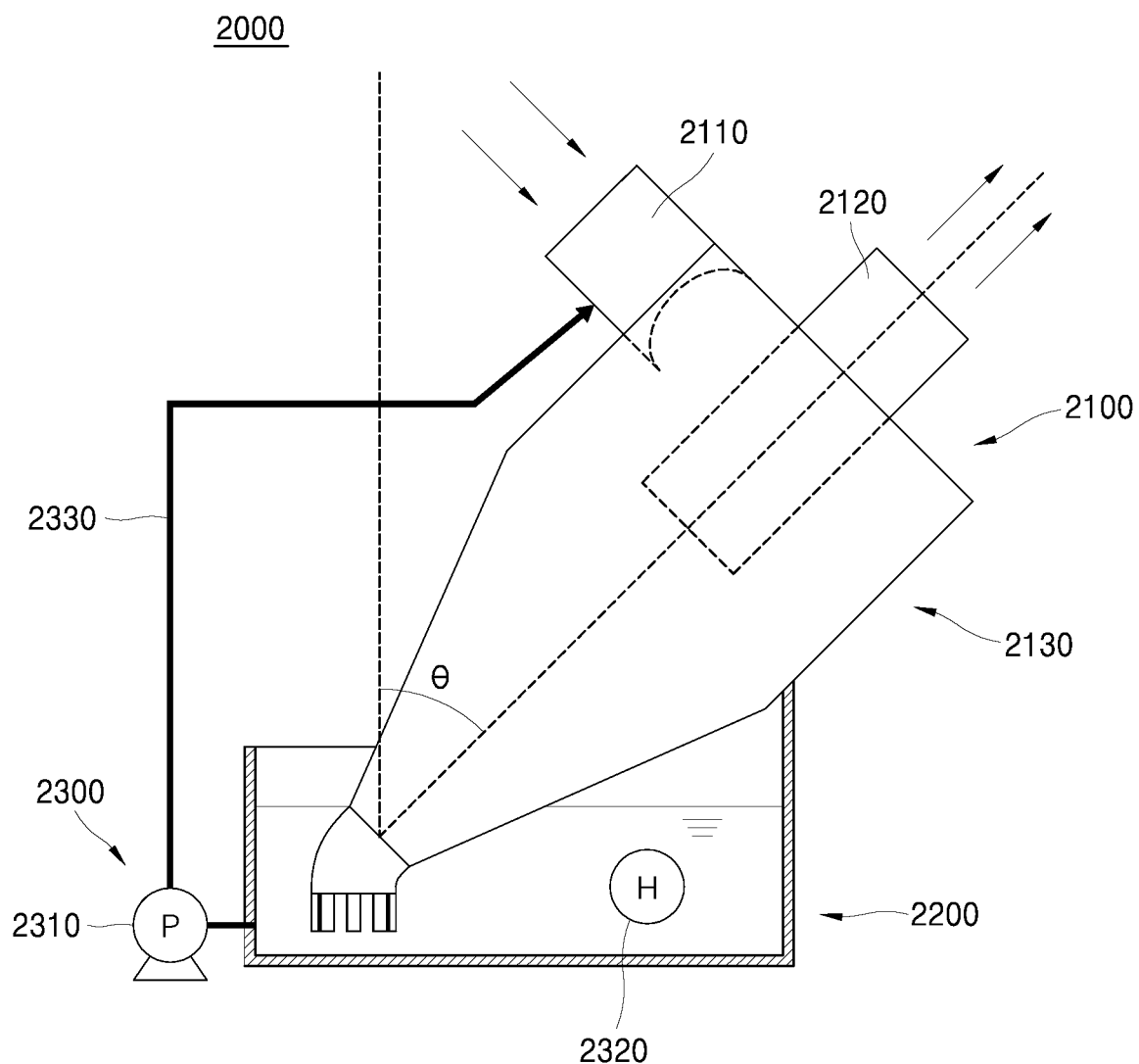
FIG. 3 is a view schematically showing a filtering module according to a second exemplary embodiment of the present disclosure.

FIG. 3 is a view schematically showing a filtering module according to a second exemplary embodiment of the present disclosure.

As shown in FIG. 3, a filtering module 2000 is different from the filtering module 1000 shown in FIG. 2 only in a position of the heater.

More specifically, the filtering module 2000 includes a cyclone 2100, a water tank 2200, and a fluid circulating part 2300. The cyclone 2100 includes a contaminated air inlet part 2110, a cleaned air outlet part 2120, and a body part 2130.

The fluid circulating part 2300 includes a pump 2310, a heater 2320, and a connection pipe 2330.

The heater 2320 is mounted in the water tank 2200, and the fluid pre-stored in the water tank 2200 is heated by heat exchange with the heater 2320.

Since the same configurations are described above, a detailed description thereof will be omitted.

Figure 4:
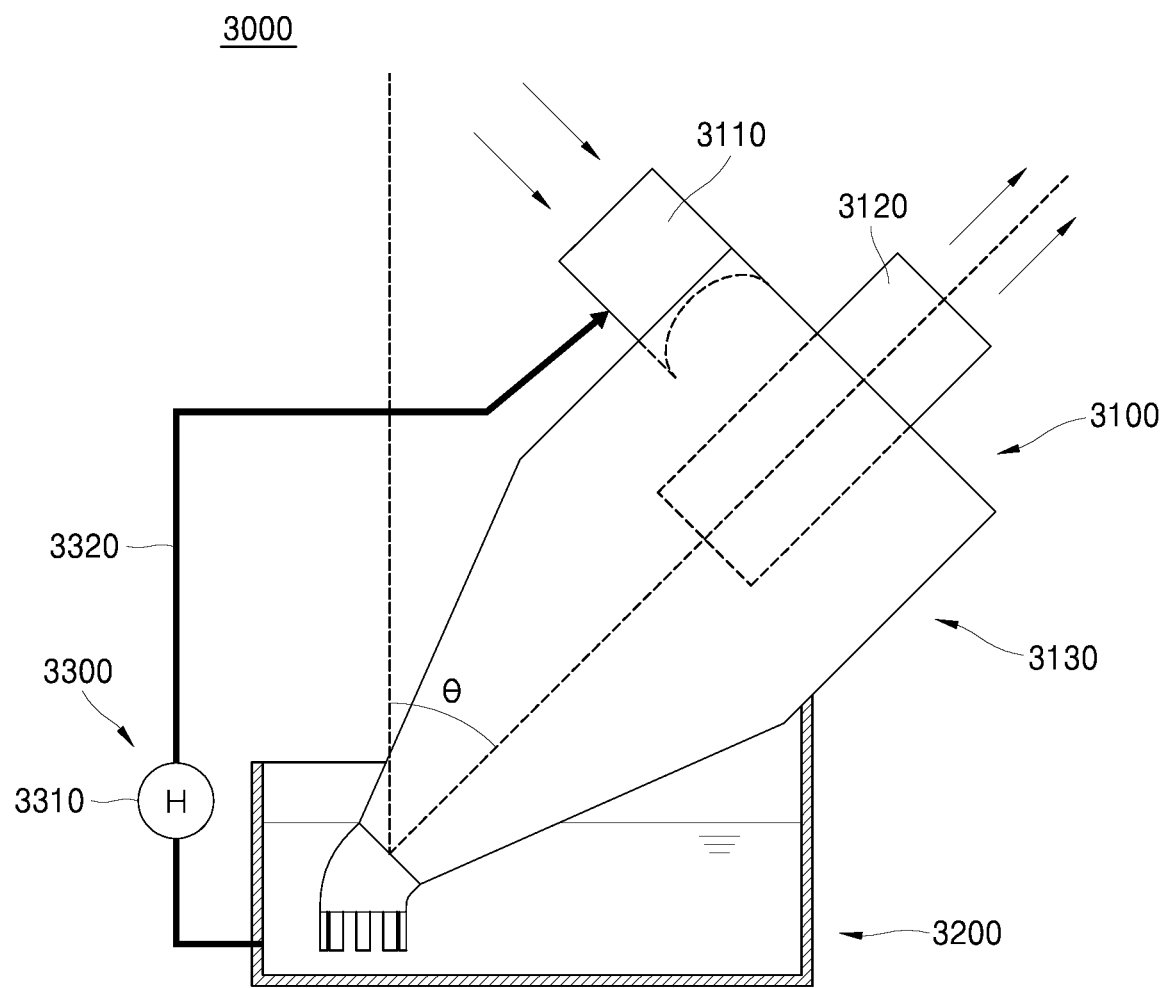
FIG. 4 is a view schematically showing a filtering module according to a third exemplary embodiment of the present disclosure.

FIG. 4 is a view schematically showing a filtering module according to a third exemplary embodiment of the present disclosure.

As shown in FIG. 4, a filtering module 3000 is different from the filtering module 1000 shown in FIG. 2 only in the presence or absence of the pump.

More specifically, the filtering module 3000 includes a cyclone 3100, a water tank 3200, and a fluid circulating part 3300. The cyclone 3100 includes a contaminated air inlet part 3110, a cleaned air outlet part 3120, and a body part 3130.

The fluid circulating part 3300 includes a heater 3310 and a connection pipe 3320.

The heater 3310 is provided to heat the mixed water discharged through the water tank 3200 to generate vapor, such as steam. The connection pipe 3320 interconnects the water tank 3200, the heater 3310, and the contaminated air inlet part 3110, and the vapor generated through the heater 3310 is supplied to the contaminated air inlet part 3110.

Since the same configurations are described above, a detailed description thereof will be omitted.

Figure 5:
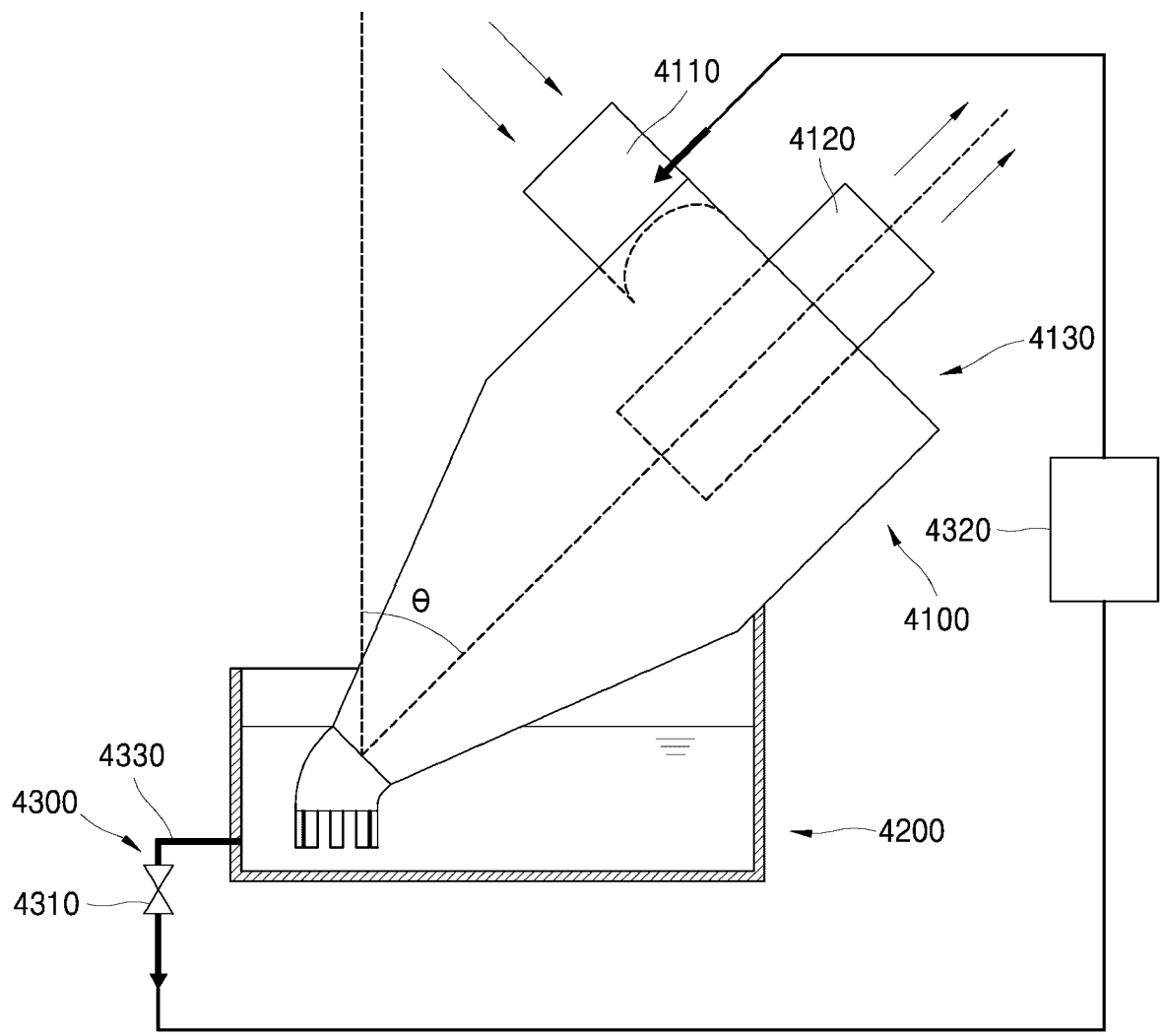
FIG. 5 is a view schematically showing a filtering module according to a fourth exemplary embodiment of the present disclosure.

FIG. 5 is a view schematically showing a filtering module according to a fourth exemplary embodiment of the present disclosure.

As shown in FIG. 5, a filtering module 4000 is different from the filtering module 1000 shown in FIG. 2 only in the fluid circulating part.

More specifically, the filtering module 4000 includes a cyclone 4100, a water tank 4200, and a fluid circulating part 4300. The cyclone 4100 includes a contaminated air inlet part 4110, a cleaned air outlet part 4120, and a body part 4130.

The fluid circulating part 4300 includes a valve 4310, a hot water tank 4320, and a connection pipe 4330.

The valve 4310 is connected to the connection pipe 4330 connected to the water tank 4200, and is disposed between the water tank 4200 and the hot water tank 4320. The valve 4310 controls the discharge of the mixed water stored in the water tank 4200 so as to supply it to the hot water tank 4320.

The hot water tank 4320 is connected to the contaminated air inlet part 4110 of the cyclone 4100 through the connection pipe 4330.

The contaminated air introduced through the contaminated air inlet part 4110 is cleaned by being in contact with hot water supplied through the hot water tank 4320.

Since the same configurations are described above, a detailed description thereof will be omitted.

Figure 6:
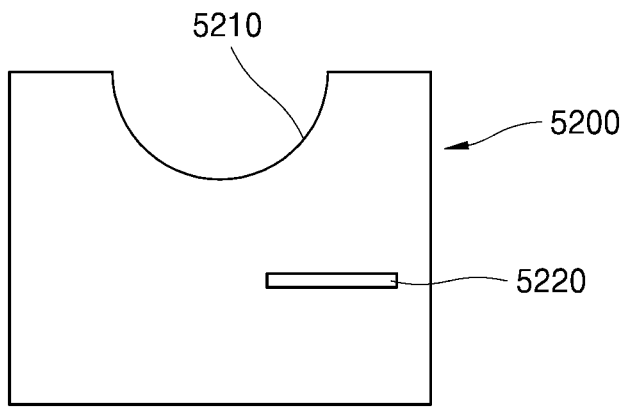
FIG. 6 is a schematic view of a water tank in the filtering module according to the present disclosure.

FIG. 6 is a schematic view of a water tank in the filtering module according to the present disclosure.

As shown in FIG. 6, a water tank 5200 has a groove part 5210 formed in one side thereof so that the cyclone is coupled or supported thereto while having an inclined angle, and is provided with a foreign material discharging part 5220 which may be opened and closed.

The shape of the groove part 5210 corresponds to the cylindrical body of the cyclone.

The foreign material discharging part 5220 may be formed to correspond to the surface of water of the fluid pre-stored in the water tank 5200 by taking into account that the foreign materials containing oil are suspended on the surface of water of the water tank 5200. The groove part 5210 and the foreign material discharging part 5220 may be provided in any of the embodiments discussed in FIGS. 2-5.

As set forth above, according to the exemplary embodiments of the present disclosure, as the contaminated air is in contact with the cleaning water or vapor through the inclined cyclone, and the foreign materials such as oil and the like contained in the contaminated air are efficiently separated from the contaminated air by a flow by a wide contact area and centrifugal force, it is possible to obtain the cyclone having the improved cleaning performance and the filtering module having the same.

Further, the foreign materials such as oil and the like are removed from the cleaning water or vapor, thereby cleaning the contaminated air to be circulated as the cleaning water or vapor, so that it is possible to reduce the maintenance cost.

According to the present disclosure, as the contaminated air is cleaned using the cleaning water or vapor of the room temperature or the temperature higher than the room temperature, it is possible to prevent the foreign materials containing oil from being deposited or fixed on the inner wall of the cyclone. Further, as the filtering module having the cyclone is automatically cleaned by the flow of the cleaning water or vapor, it is possible to obtain the cyclone for air-cleaning having improved facilities of use and the filtering module having the same.

It is to be understood that the exemplary embodiments described above are illustrative in all aspects and not restrictive, and the scope of the present disclosure is defined by the appended claims rather than the foregoing description. Further, it should be construed that the meaning and scope of the claims, and all changes and modifications derived from an equivalent concept thereof, fall within the scope of the present disclosure.

What is claimed is:

1. An air filtering module comprising:
a cyclone including:
   a contaminated air inlet part into which external contaminated air and cleaning water for cleaning the contaminated air are introduced; and
   a cleaned air outlet part through which air is discharged after being cleaned by bringing the cleaning water into contact with the contaminated air;
a water tank coupled to the cyclone, the water tank being configured to receive the cleaning water from the cyclone, and to store the cleaning water; and
a fluid circulating part configured to provide the cleaning water stored in the water tank to the contaminated air inlet part,
wherein the fluid circulating part includes:
   a pump configured to supply the cleaning water stored in the water tank to the contaminated air inlet part;
   a heater configured to increase a temperature of the cleaning water supplied by the pump, to thereby supply the cleaning water at an increased temperature to the contaminated air inlet part;
   a connection pipe interconnecting the water tank, the pump, the heater, and the contaminated air inlet part; and
   a temperature sensor configured to measure the temperature of the cleaning water which is supplied to the contaminated air inlet part,
wherein the cyclone further includes:
   a cylindrical body including the contaminated air inlet part and the cleaned air outlet part, the contaminated air inlet part and the cleaned air outlet part being in communication with one another;
   a conical body extending from the cylindrical body in a downward direction of the cylindrical body; and
   a discharging part extending from the conical body in a downward direction of the conical body,
wherein the contaminated air inlet part is located at an upper end portion of a side of the cylindrical body, the contaminated air inlet part being arranged so that the contaminated air is introduced in a sideward direction of the cylindrical body,
wherein the cleaned air outlet part is located at the upper end portion of the cylindrical body, the cleaned air outlet part being arranged so that the cleaned air is discharged in an axial direction of the cylindrical body,
wherein the cleaned air outlet part is disposed in a direction orthogonal to the contaminated air inlet part,
wherein a central axis of the cyclone is inclined at an inclined angle with respect to a surface of the cleaning water stored in the water tank, and
wherein the water tank includes:
   a groove part configured to receive a side of the cyclone and to support the cyclone at the inclined angle; and
   a foreign material discharging part located at a position corresponding to the surface of the cleaning water stored in the water tank, the foreign material discharging part being openable and closable.

2. The air filtering module of claim 1, wherein the cleaned air outlet part includes an extension part extending below the cylindrical body, and
wherein the cleaned air is discharged through the extension part.

3. The air filtering module of claim 2, wherein a lower end of the discharging part is located below a surface of the cleaning water stored in the water tank, and
wherein the discharging part includes at least one discharging slit.

4. The air filtering module of claim 1, wherein the cleaning water comprises water mixed with a pre-stored fluid.

5. The air filtering module of claim 1,
wherein a lower end of the discharging part is located below a surface of the cleaning water stored in the water tank.

* * * * *